US011319857B2

(12) United States Patent
Lundström et al.

(10) Patent No.: US 11,319,857 B2
(45) Date of Patent: May 3, 2022

(54) METHOD AND SYSTEM FOR DIAGNOSING AN AFTERTREATMENT SYSTEM

(71) Applicant: Scania CV AB, Södertälje (SE)

(72) Inventors: Mikael Lundström, Hägersten (SE); Sebastian Zamani, Stockholm (SE); Carl Wahlström, Hägersten (SE)

(73) Assignee: Scania CV AB, Södertälje (SE)

( * ) Notice: Subject to any disclaimer, the term of this patent is extended or adjusted under 35 U.S.C. 154(b) by 576 days.

(21) Appl. No.: 16/316,318

(22) PCT Filed: Jul. 6, 2017

(86) PCT No.: PCT/SE2017/050755
§ 371 (c)(1),
(2) Date: Jan. 8, 2019

(87) PCT Pub. No.: WO2018/013038
PCT Pub. Date: Jan. 18, 2018

(65) Prior Publication Data
US 2021/0293172 A1 Sep. 23, 2021

(30) Foreign Application Priority Data

Jul. 14, 2016 (SE) .................................. 1651058-8

(51) Int. Cl.
F01N 11/00 (2006.01)
F01N 3/20 (2006.01)

(52) U.S. Cl.
CPC .............. F01N 11/00 (2013.01); F01N 3/208 (2013.01); F01N 3/2066 (2013.01);
(Continued)

(58) Field of Classification Search
CPC ...... F01N 11/00; F01N 3/208; F01N 2570/14; F01N 2900/0418; F01N 2900/1812;
(Continued)

(56) References Cited

U.S. PATENT DOCUMENTS 7,987,661 B2    8/2011  Jung
9,132,386 B2    9/2015  Udd et al.
(Continued)

FOREIGN PATENT DOCUMENTS

CN    1981915 A      6/2007
CN    101344028 A    1/2009
(Continued)

OTHER PUBLICATIONS

Scania CV AB, European Application No. 17828062.4, Extended European Search Report, dated Dec. 19, 2019.
(Continued)

Primary Examiner — Brandon D Lee
(74) Attorney, Agent, or Firm — Moore & Van Allen PLLC; W. Kevin Ransom

(57) ABSTRACT

The present invention relates to a method for diagnosing aftertreatment of exhaust gases resulting from combustion, wherein at least a first substance resulting from said combustion is reduced by supplying additive to an exhaust gas stream resulting from said combustion and use of a first reduction catalytic converter. The method includes: estimating an accumulated expected reduction of said first substance during a first period of time, determining an accumulated actual reduction of said first substance during a period of time at least substantially overlapping said first period of time, and generating a signal indicating a fault in said reduction of said first substance when said accumulated actual reduction differs from said accumulated expected reduction by a predetermined difference in occurrence of said first substance. The invention also relates to a corresponding system.

19 Claims, 4 Drawing Sheets

(52) U.S. Cl.
CPC ...... *F01N 2550/02* (2013.01); *F01N 2550/05* (2013.01); *F01N 2560/026* (2013.01); *F01N 2570/14* (2013.01); *F01N 2610/02* (2013.01); *F01N 2900/0418* (2013.01); *F01N 2900/0421* (2013.01); *F01N 2900/0601* (2013.01); *F01N 2900/1812* (2013.01); *F01N 2900/1814* (2013.01); *F01N 2900/1818* (2013.01); *F01N 2900/1821* (2013.01)

(58) Field of Classification Search
CPC ......... F01N 2550/05; F01N 2900/1821; F01N 2900/0601; F01N 2610/02; F01N 2560/026; F01N 2550/02; F01N 2900/1818; F01N 2900/1814; F01N 2900/0421; F01N 3/2066
See application file for complete search history.

(56) References Cited

U.S. PATENT DOCUMENTS

| | | | |
|---|---|---|---|
| 9,492,788 | B2 | 11/2016 | Gaudin |
| 9,494,096 | B2 | 11/2016 | Pfaffinger |
| 9,593,611 | B2 | 3/2017 | Kawaguchi et al. |
| 9,593,617 | B2 | 3/2017 | Veldten et al. |
| 9,624,804 | B2 | 4/2017 | Matsumoto et al. |
| 9,657,629 | B2 | 5/2017 | Iwatani |
| 10,052,588 | B2 | 8/2018 | Tanioka |
| 2004/0040284 | A1 | 3/2004 | Upadhyay et al. |
| 2005/0103000 | A1 | 5/2005 | Nieuwstadt et al. |
| 2007/0160508 | A1 | 7/2007 | Doumeki et al. |
| 2008/0271437 | A1 | 11/2008 | Matsunaga |
| 2009/0217644 | A1 | 9/2009 | Jung |
| 2009/0277159 | A1 | 11/2009 | Driscoll et al. |
| 2010/0043397 | A1 | 2/2010 | Wang et al. |
| 2010/0218487 | A1 | 9/2010 | Wang et al. |
| 2010/0326051 | A1 | 12/2010 | Busch et al. |
| 2011/0023456 | A1* | 2/2011 | Levijoki .............. F01N 3/208 60/274 |
| 2011/0146239 | A1 | 6/2011 | Handler et al. |
| 2011/0203259 | A1* | 8/2011 | Upadhyay ............ F01N 13/009 60/274 |
| 2012/0096837 | A1* | 4/2012 | Yacoub ................ F01N 3/208 60/274 |
| 2012/0233986 | A1 | 9/2012 | Geveci et al. |
| 2013/0232958 | A1 | 9/2013 | Ancimer et al. |
| 2013/0298655 | A1 | 11/2013 | Kowalkowski et al. |
| 2013/0319070 | A1* | 12/2013 | Klenk ................. G01N 33/00 73/1.02 |
| 2013/0338900 | A1 | 12/2013 | Ardanese et al. |
| 2014/0065041 | A1 | 3/2014 | Szailer et al. |
| 2014/0127100 | A1 | 5/2014 | Gerhart et al. |
| 2014/0223886 | A1 | 8/2014 | Khaled et al. |
| 2014/0373511 | A1 | 12/2014 | Osburn et al. |
| 2015/0040543 | A1 | 2/2015 | Shetney et al. |
| 2015/0209730 | A1 | 7/2015 | Blanckenfiell et al. |
| 2015/0247435 | A1 | 9/2015 | Garimella et al. |
| 2015/0273395 | A1 | 10/2015 | Catalogna et al. |
| 2016/0069243 | A1 | 3/2016 | Hegemann et al. |
| 2016/0186630 | A1* | 6/2016 | Osburn ................ F01N 3/2066 60/274 |
| 2017/0051654 | A1* | 2/2017 | Gupta .................... F01N 3/035 |
| 2017/0122159 | A1 | 5/2017 | Bahrami |
| 2017/0130629 | A1 | 5/2017 | Nagel et al. |

FOREIGN PATENT DOCUMENTS

| | | |
|---|---|---|
| CN | 103764565 A | 4/2014 |
| CN | 104053871 A | 9/2014 |
| CN | 104220710 A | 12/2014 |
| CN | 104343512 A | 2/2015 |
| CN | 104603412 A | 5/2015 |
| CN | 104813002 A | 7/2015 |
| DE | 102007040439 A1 | 3/2009 |
| DE | 102011003084 A1 | 7/2012 |
| DE | 102012211703 A1 | 1/2014 |
| DE | 102013209487 A1 | 11/2014 |
| EP | 2918805 A1 | 9/2015 |
| EP | 2977578 A1 | 1/2016 |
| EP | 3009622 A1 | 4/2016 |
| JP | H09189214 A | 7/1997 |
| JP | 2013130120 A | 4/2016 |
| JP | 2016098682 A | 5/2016 |
| KR | 10-2015-0023931 A | 3/2015 |
| WO | 2014014399 A1 | 1/2014 |
| WO | 2015046276 A1 | 4/2015 |
| WO | 2015115978 A1 | 8/2015 |
| WO | 2016010558 A1 | 1/2016 |

OTHER PUBLICATIONS

Scania CV AB, Chinese Application No. 201780042163.8, First Office Action, May 27, 2020.
International Preliminary Report on Patentability for International Patent Application No. PCT/SE2017/050755 dated Jan. 15, 2019.
International Search Report for International Patent Application No. PCT/SE2017/050755 dated Oct. 5, 2017.
Written Opinion of the International Searching Authority for International Patent Application No. PCT/SE2017/050755 dated Oct. 5, 2017.

* cited by examiner

METHOD AND SYSTEM FOR DIAGNOSING AN AFTERTREATMENT SYSTEM

CROSS-REFERENCE TO RELATED APPLICATIONS

This application is a national stage application (filed under 35 § U.S.C. 371) of PCT/SE2017/050755, filed Jul. 6, 2017 of the same title, which, in turn, claims priority to Swedish Application No. 1651058-8 filed Jul. 14, 2016; the contents of each of which are hereby incorporated by reference.

FIELD OF THE INVENTION

The present invention relates to combustion processes, and in particular to a method and system for diagnosing an aftertreatment system for treating exhaust gases resulting from combustion. The present invention also relates to a vehicle, as well as a computer program and a computer program product that implement the method according to the invention.

BACKGROUND OF THE INVENTION

With regard to vehicles in general, and at least to some extent heavy/commercial vehicles such as trucks, buses and the like, there is constantly ongoing research and development with regard to increasing fuel efficiency and reducing exhaust emissions.

This is often at least partly due to growing governmental concern in pollution and air quality, e.g. in urban areas, which has also led to the adoption of various emission standards and rules in many jurisdictions.

These emission standards often consist of requirements that define acceptable limits for exhaust emissions of vehicles being provided with internal combustion engines. For example, the exhaust levels of e.g. nitrogen oxides ($NO_x$), hydrocarbons (HC), carbon monoxide (CO) and particles are regulated for most kinds of vehicles in these standards.

The undesired emission of substances can be reduced by reducing fuel consumption and/or through the use of aftertreatment (purifying) of the exhaust gases that results from the combustion process.

Exhaust gases from the internal combustion engine can, for example, be treated through the use of catalytic processes. There exist various kinds of catalytic converters for use in such processes, where different types can be used for different kinds of fuel and/or for treatment of different kinds of substances occurring in the exhaust gas stream. With regard to at least nitrogen oxides $NO_x$ (such as, for example, nitric oxide NO and nitrogen dioxide $NO_2$, respectively) heavy vehicles often comprises a method where an additive is supplied to the exhaust gas stream. The additive is supplied in order to, usually through the use of a catalytic converter, reduce the presence of nitrogen oxides $NO_x$ to less pollutive substances (mainly nitrogen and water vapour).

The additive can be injected into the exhaust gas stream upstream the catalytic converter, and one common type of catalytic converter that is used in reduction of nitrogen oxides $NO_x$ of this kind is Selective Catalytic Reduction (SCR) catalytic converters.

It is essential that the amount of additive that is supplied to the exhaust gas stream is neither too great nor too small. Consequently, it is desirable that the supplied amount of additive corresponds to an expected amount of additive. Further, with regard to the reduction it is also essential that the additive consists of an additive of an expected kind.

SUMMARY OF THE INVENTION

It is an object of the present invention to provide a method and system for diagnosing supply of additive to an exhaust gas stream. This object is achieved by a method according to claim 1.

According to the present invention, it is provided a method for diagnosing aftertreatment of exhaust gases resulting from combustion, wherein at least a first substance resulting from said combustion is reduced by supplying additive to an exhaust gas stream resulting from said combustion and use of a first reduction catalytic converter. The method includes:
  estimating an accumulated expected reduction of said first substance during a first period of time,
  determining an accumulated actual reduction of said first substance during a period of time at least substantially overlapping said first period of time, and
  generating a signal indicating a fault in said reduction of said first substance when said accumulated actual reduction differs from said accumulated expected reduction by a predetermined difference in occurrence of said first substance $NO_x$.

As was mentioned above, the presence of at least some substances (as is explained below, in the present description and claims, the term substance includes compounds as well) in an exhaust gas stream resulting from combustion can be reduced through the supply of an additive to the exhaust gas stream. A reagent of the additive then reacts with one or more substances occurring in the exhaust gas stream to thereby form less hazardous substances.

For example, the supply of additive can be used to reduce the concentration of nitrogen oxides $NO_x$ such as $NO_x$ $NO_2$, or other substances in the exhaust gases. It is, however, important that the additive (reagent) is supplied to the exhaust gas stream in a proportion that corresponds to the presence of the one or more substances/compositions that is to be reduced in order to achieve the desired effect. It is also important that the additive comprises a reagent of a kind that is capable of performing the desired reduction. If a wrong kind of reagent/additive is supplied, and/or if the supplied amount of additive, and thereby reagent, is too small in relation to the presence of the substance/composition to be reduced, undesired surplus of the substance may still remain after the reduction and be emitted into the surroundings.

Conversely, if the amount of additive and thereby reagent being supplied to the exhaust gas stream is high in relation to the at least one substance/composition to be reduced, the supply of additive may cause a surplus of other undesired substances instead. For example, with regard to $NO_x$ reduction using urea or ammonia, if excess amounts of additive are supplied to the exhaust gas stream, a surplus of ammonia may be emitted into the surroundings. Ammonia is classified as a hazardous substance, and emissions of ammonia are also often regulated.

In order to ensure that additive of desired quality and amount is provided to the exhaust gas stream, and to avoid replacement of additive with less suitable, but economically more favourable, alternatives, as may be the case, there are, presently and/or upcoming, at least in some jurisdictions requirements regarding onboard diagnostics (OBD). That is, the vehicle is required to be able to detect deviations with regard to the reduction of undesired substances during vehicle operation.

The present invention provides a method for diagnosing aftertreatment of exhaust gases resulting from combustion, such as diagnosing reduction of at least one substance occurring in the exhaust gas stream using an additive.

According to the invention, this is accomplished by estimating an accumulated expected reduction of a substance to be reduced during a first period of time. The expected, i.e. predicted, reduction can be determined by accumulating a supply of additive during said first period of time, i.e. a total amount/quantity of additive being supplied to the exhaust gas stream during said first period of time. On the basis of supplied additive, the estimation of expected reduction of the substance can be performed for the supply as a whole, i.e. based on the total accumulated supply, where e.g. known chemical relations can be used to determine reduction on the basis of amounts of additive that has been supplied to the exhaust gas stream. The estimation of expected reduction can also be performed as an integration or sum of the reduction at each moment, or fraction, of said first period of time, during said first period of time so that a total expected reduction of said first substance during the first period of time is estimated. The reduction can be determined e.g. in a quantity per unit time, such as grams (g) per hour, or e.g. quantity per unit work produced by the internal combustion engine, such as grams (g) per kWh. The reduction can also be determined in any other suitable way, such as a percentage of total occurrence etc.

As was mentioned, the additive comprises a reagent, and a determination of supply of additive is equivalent to a determination of supply of reagent since the composition of the additive is in general known or at least believed to be known, e.g. through the use of a quality sensor.

Further, an accumulated actual reduction of said first substance is determined, preferably for said first period of time but at least for a period of time that at least substantially overlaps, that is, coincides in absolute time with, said first period of time. Should the periods differ, i.e. the accumulation of the actual reduction and the estimation of the expected reduction does not both start at the same starting point in time and end at the same ending point in time, this may be compensated for by a factor e.g. being dependent on the amount of additive injected during the differing portion of time of accumulations. Still the accumulations are performed for substantially the same time interval in terms of absolute time, and not for different completely non-overlapping periods of time. The first period of time hence has a defined starting point in time and a defined ending point in time, and both the accumulation of the actual reduction and the estimation of the expected reduction is determined completely or at least substantially for this interval in absolute time.

The estimated expected reduction and the actual reduction can then be compared, and a signal indicating a fault in the reduction of the first substance can be generated if the comparison indicates that the actual reduction deviates from the expected reduction by a predetermined difference in occurrence of said first substance $NO_x$.

The reduction can be expressed in various ways, and for example, a signal indicating a fault may be generated when the comparison indicates an actual occurrence following reduction that exceeds the accumulated expected occurrence by said predetermined difference in occurrence, e.g. a difference in occurrence constituting some suitable percentage, such as a percentage in the interval 10%-30%, or any other suitable interval.

In general, the accumulated reductions can be determined e.g. as accumulated quantities of said first substance, such as quantities being reduced or quantities remaining in the exhaust gas stream following reduction.

With regard to the expected reduction of the substance to be reduced, this can be arranged to be estimated on the basis of supplied additive, and in addition also on an occurrence of the substance in the exhaust gas stream, which e.g. can be determined using a model of the exhaust gases, as is known per se, or using a sensor, such as e.g. a $NO_x$ sensor with regard to NOR, arranged upstream the supply of additive. A quality of the additive may also be utilized, e.g. to determine the amount of reagent in the additive, and the quality can be arranged to be determined using a quality sensor being subjected to the exhaust gas stream, such as a sensor being submersed in a tank containing additive.

With regard to actual reduction, the occurrence of the substance to be reduced is measured at least downstream the supply of additive, e.g. using a sensor.

The actual reduction can be determined by determining the presence (occurrence) of the substance to be reduced upstream the supply of additive, e.g. according to the determination exemplified above by means of a model or use of a sensor located upstream the supply of additive, and compare this occurrence with a measured occurrence downstream the supply of additive. The measurement downstream the supply of additive is preferably performed downstream a catalytic converter being utilized to facilitate the reduction when such is used.

Furthermore, the presence (occurrence) of the substance to be reduced may be determined while additive is supplied to said exhaust gas stream using a model representation of the combustion and thereby exhaust gases resulting from the combustion, or alternatively or in addition by use of a sensor located upstream the supply of additive.

The presence (occurrence) of the substance to be reduced upstream the supply of additive, may be determined continuously during the period of time for which the actual reduction is accumulated. In this way, variations in time in the occurrence of the substance to be reduced can be accounted for during the accumulation. Such variations may occur e.g. when the diagnosing is performed while the vehicle is being driven during normal use. Hence it is not a requirement that measurements are performed for steady state conditions.

The accumulated supply of additive can be determined by determining a decrease in a degree of filling in a tank containing said additive, and/or from injection pressure and opening time of an injection nozzle injecting said additive into the exhaust gas stream. Different time periods for accumulating the supply of additive may be used, e.g. in dependence of method for determining amount of supplied additive, and the time period may e.g. be in the order 2 minutes to 4 hours or more. For example, the time period may be any time period in the interval 10-30 minutes or more.

Furthermore, the time period may also be arranged to be determined as a period of time during which the internal combustion engine produces at least some suitable amount of work, e.g. in terms of kWh. The time period may alternatively or in addition be determined as a time period during which at least a minimum accumulated quantity of additive has been injected into the exhaust gas stream.

In this way, the time period may hence vary e.g. in dependence of the current operating conditions of the vehicle, where the diagnosis may take a longer period of time when the vehicle is operated under low-load conditions in comparison to when operated in higher-load conditions.

A first accumulation utilizing e.g. injection pressure and opening time of the injection nozzle can be performed, and if this accumulation indicates a fault, a further accumulation using change in degree of filling in the tank containing additive can be used to verify the fault, or determine that there in fact is no fault.

The supplying of said first additive can be arranged to be performed upstream a first catalytic converter. This catalytic converter can be arranged to be a selective catalyst reduction (SCR) catalytic converter. Hence diagnosing of aftertreatment can be performed in a system where additive is supplied upstream a first catalytic converter and reduction is determined as a difference in occurrence of the substance to be reduced upstream said supply of additive and downstream the catalytic converter.

Furthermore, the substance being reduced can be any substance. According to embodiments of the invention, the substance being reduced is at least nitrogen oxides $NO_x$.

The invention may be carried out in a vehicle, where the combustion may occur in at least one combustion chamber of an internal combustion engine of the vehicle.

The invention also relates to a system corresponding to the method set forth above. The system is characterised in means carrying out features of the invention. Such means for carrying out features of the invention can consist of any suitable means, and the means can be specifically adapted to perform the features set forth in the system claims. Such means can consist of one or more control units, or other electrical, mechanical and/or electromechanical elements or arrangements.

Further characteristics of the present invention and advantages thereof are indicated in the detailed description of exemplary embodiments set out below and the attached drawings.

DETAILED DESCRIPTION OF THE INVENTION

In the following detailed description the present invention will be exemplified for a vehicle. The invention is, however, applicable also in other kinds of transportation means, such as air and water crafts. The invention is also applicable in fixed installations.

Furthermore, the present invention is exemplified below for a urea based additive for reduction of nitrogen oxides. The present invention is, however, applicable for any kind of suitable additive, where the additive can be arranged for reduction of any substance/compound in the exhaust gas stream, and hence not necessarily nitrogen oxides.

Further, in the present description and the appended claims the expression "substance" is defined to include chemical compounds as well as mixtures.

Figure 1A:
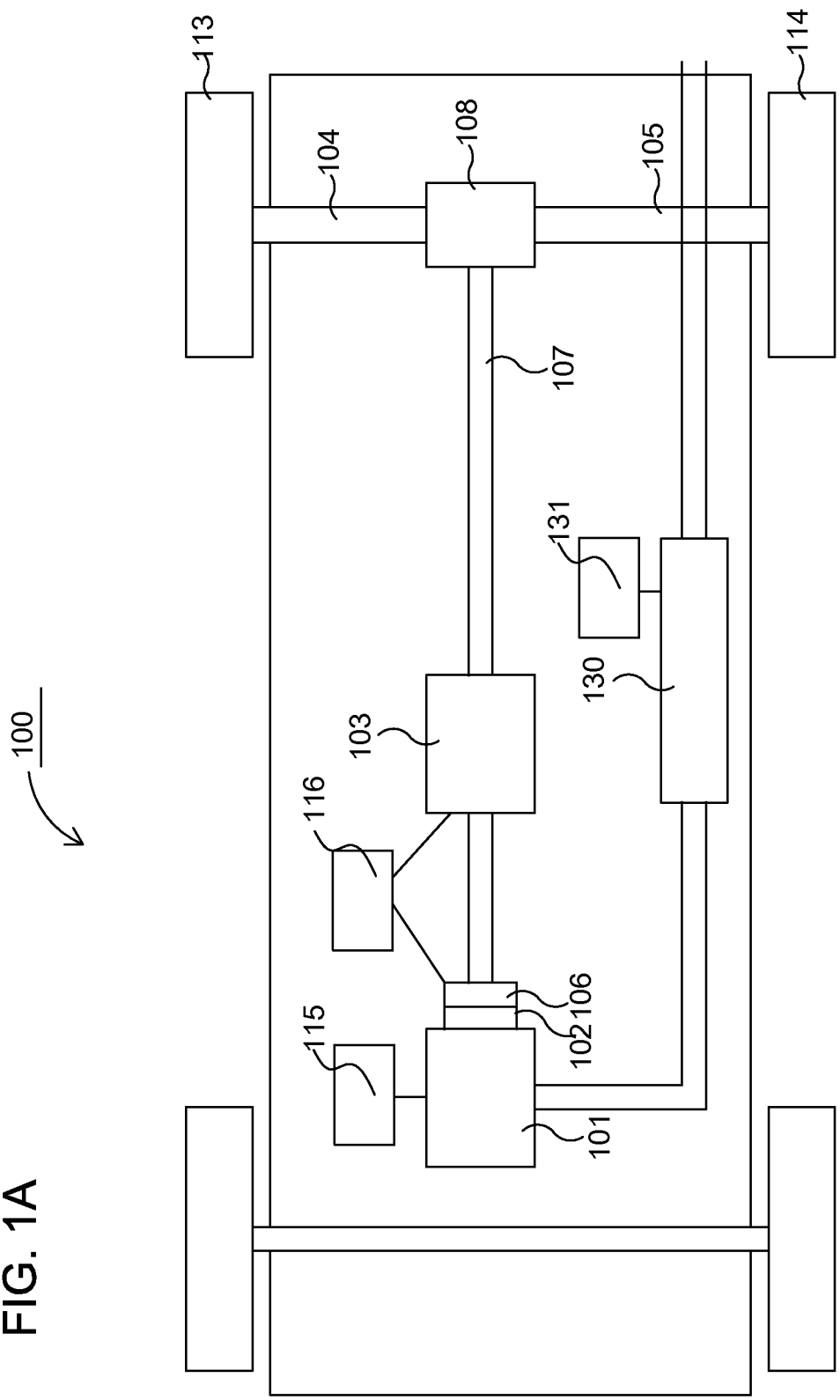
FIG. 1A illustrates a powertrain of an exemplary vehicle in which the present invention advantageously can be utilized.

FIG. 1A schematically depicts a powertrain of an exemplary vehicle 100. The powertrain comprises a power source, in the present example an internal combustion engine 101, which, in a conventional manner, is connected via an output shaft of the internal combustion engine 101, normally via a flywheel 102, to a gearbox 103 via a clutch 106. An output shaft 107 from the gearbox 103 propels drive wheels 113, 114 via a final gear 108, such as a common differential, and half shafts 104, 105 connected to said final gear 108.

The internal combustion engine 101 is controlled by the vehicle control system via a control unit 115. The clutch 106 and gearbox 103 are also controlled by the vehicle control system by means of a control unit 116.

FIG. 1A, consequently, discloses a powertrain of a specific kind, but the invention is applicable in any kind of powertrain and also e.g. in hybrid vehicles where an internal combustion engine is used. The disclosed vehicle further comprises one or more aftertreatment components 130 for aftertreatment (purifying) of exhaust gases that results from combustion in the internal combustion engine 101. The functions of the one or more aftertreatment components 130 are controlled by means of a control unit 131.

The one or more aftertreatment components 130 can be of various kinds and designs, and according to the disclosed embodiment an additive is supplied to the exhaust gas stream. An example of a setup of aftertreatment components where the present invention can be utilized is shown more in detail in FIG. 2, and in the disclosed exemplary embodiment aftertreatment of exhaust gases are performed using a selective catalytic reduction (SCR) catalytic converter 201. As is in general the case, the aftertreatment can also comprise further non-disclosed components, such as, for example, further catalytic converters and/or particle filters which can be arranged upstream or downstream the SCR catalytic converter 201.

The supply of additive can, for example, be used in reduction of the concentration of nitrogen oxides $NO_x$ in the exhausts from the internal combustion engine through the use of an SCR catalytic converter prior to emission into the surroundings of the vehicle.

This additive can, as in the present example, for example be an additive comprising urea as reagent and e.g. consist of AdBlue which constitutes a frequently used additive and which consists of a mixture of approximately 32.5% urea dissolved in water. Urea forms ammonia when heated, and the ammonia then reacts with nitrogen oxides $NO_x$ in the exhaust gas stream. The present invention is applicable when using AdBlue, as well as when using any other urea based additive and also when using an additive completely consisting of reagent, such as pure ammonia. As was mentioned above, the invention is also applicable when using any kind of additive comprising or consisting of other reagents, and where any suitable substance in the exhaust gas stream is reduced/treated using the additive.

Figure 2:
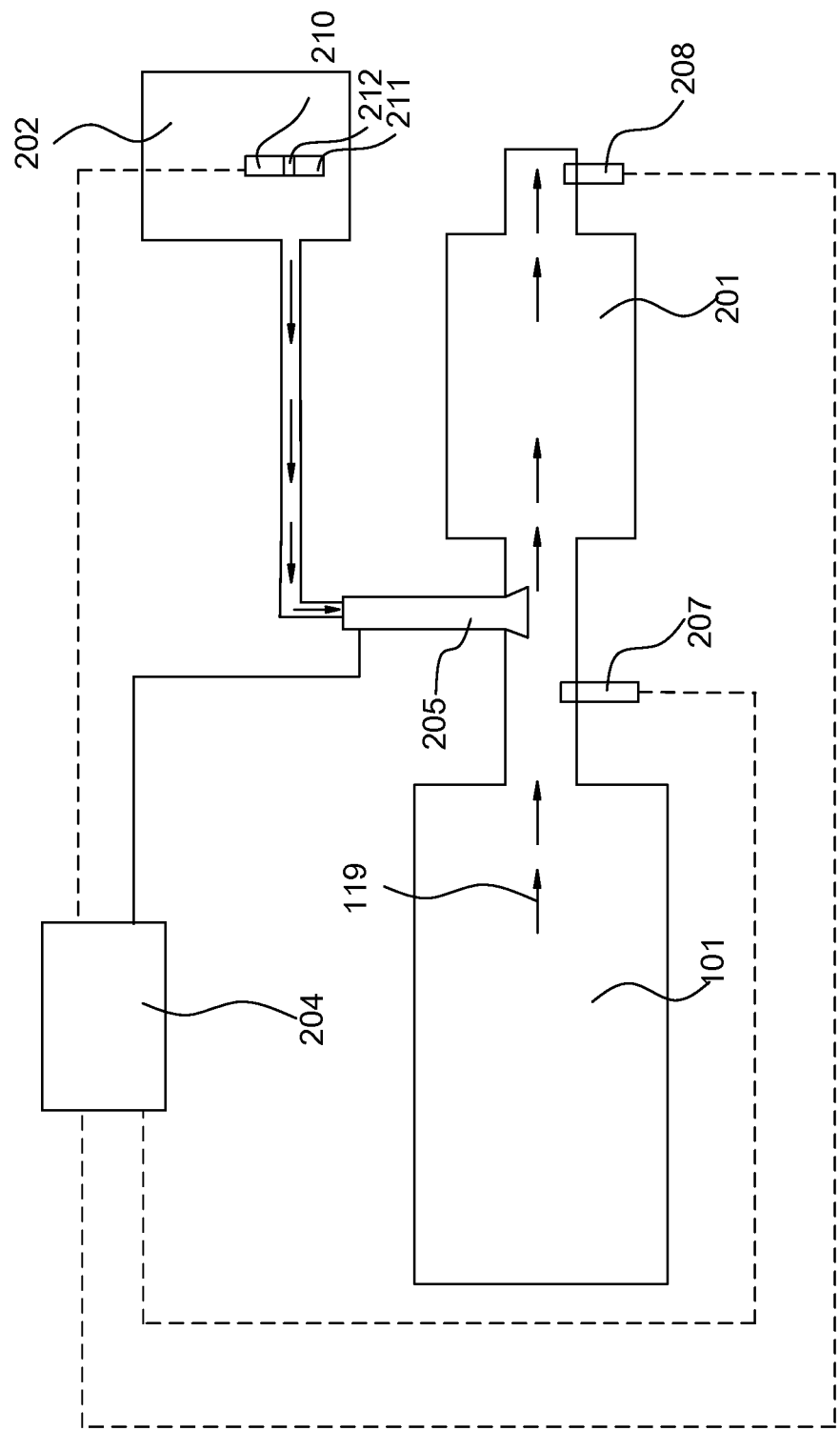
FIG. 2 illustrates an example of an aftertreatment system where a supply of additive is utilized and with which the present invention advantageously can be utilized.

Apart from said catalytic converter 201, FIG. 2 further discloses an additive dosing system, in the disclosed example a urea dosing system (UDS), which comprises a urea, or dosing, tank 202, which is connected to an injection nozzle 205 through the use of which additive is injected into the exhaust gas stream 119. The dosing of urea is controlled by a UDS control unit 204, which generates control signals for controlling the supply of additive so that a desired amount is injected into the exhaust gas stream 119 from the tank 202 using the injection nozzle 205. An armature 210 is arranged in the tank 202 and comprises a quality sensor 211 for diagnosing the quality of the additive. In addition, the armature 210 comprises a float 212 which in a conventional manner indicates the current filling level of additive in the tank 202. As an alternative to a float 212, e.g. an ultrasound sensor may be used instead to determine the filling level in the tank 202.

Dosing systems for the supply of additive are in general well described in the prior art, and the precise manner in which the supply of additive is dosed/performed is therefore not described in detail herein. In general, the dosing varies, in principle, continuously as the operating conditions of the internal combustion engine changes and thereby the generation, in this example, of nitrogen oxides therewith. Also, an SCR catalytic converter is capable of storing different amounts of ammonia for different prevailing catalytic converter temperatures, as is known per se.

However, the sole injection of additive is not in itself sufficient to ensure proper reduction of the substance to be reduced. This may, for example, be because of various reasons. For example, a wrong kind of additive may be used, or the additive may be of inferior quality, or the amount of additive being injected may in reality differ from the predetermined amount being injected, or believed to be injected. Also, there may be a malfunction in a system component.

The present invention provides a method for diagnosing the reduction to determine if the system is operating properly with regard to the reduction, and, according to embodiments of the invention, possible causes of improper operation should this be the case may also be evaluated.

Figure 3:
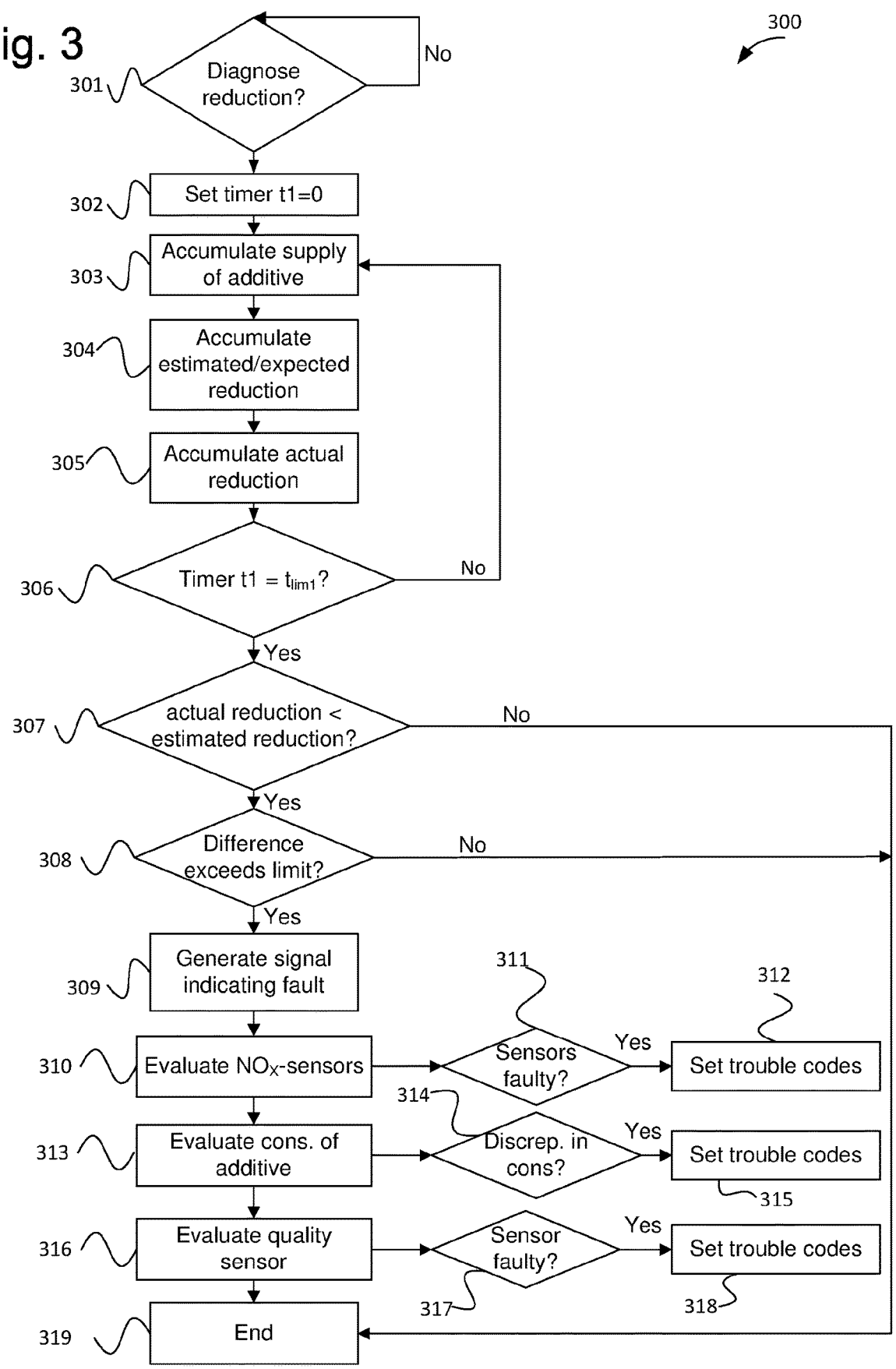
FIG. 3 illustrates an exemplary method according to one embodiment of the present invention.

An exemplary method 300 of the present invention is shown in FIG. 3, which method can be implemented at least partly e.g. in the control unit 131 for controlling aftertreatment components. As indicated above, the functions of a vehicle are, in general, controlled by a number of control units, and control systems in vehicles of the disclosed kind generally comprise a communication bus system consisting of one or more communication buses for connecting a number of electronic control units (ECUs), or controllers, to various components on board the vehicle. Such a control system may comprise a large number of control units, and the control of a specific function may be divided between two or more of them.

For the sake of simplicity, FIGS. 1A, 2 depicts only control units 115-116, 131, 204, but vehicles 100 of the illustrated kind are often provided with significantly more control units, as one skilled in the art will appreciate. Control units 115-116, 131, 204 are arranged to communicate with one another and various components via said communication bus system and other wiring, partly indicated by interconnecting lines in FIG. 1A.

The present invention can be implemented in any suitable control unit in the vehicle 100, and hence not necessarily in the control unit 131. The diagnosing of the reduction of a substance in the exhaust gas stream according to the present invention may also depend on signals being received from other control units and/or vehicle components, and it is generally the case that control units of the disclosed type are adapted to receive sensor signals from various parts of the vehicle 100. According to embodiments of the invention, the control unit 131 will, for example, receive signals e.g. from a $NO_x$ sensor 208 (see below) and from the float 212 or corresponding means and/or signals relating to the control of the injection nozzle 205, e.g. relating to injection pressure and/or opening time of the injection nozzle 205, which signals can be received, for example, from control unit 204. Control units of the illustrated type are also usually adapted to deliver control signals to various parts and components of the vehicle, e.g. to the control unit 204 to control the injection of additive e.g. when evaluating sensors as is described below.

Control of this kind is often accomplished by programmed instructions. The programmed instructions typically consist of a computer program which, when executed in a computer or control unit, causes the computer/control unit to exercise the desired control, such as method steps according to the present invention. The computer program usually constitutes a part of a computer program product, wherein said computer program product comprises a suitable storage medium 121 (see FIG. 1B) with the computer program 126 stored on said storage medium 121. The computer program can be stored in a non-volatile manner on said storage medium. The digital storage medium 121 can, for example, consist of any of the group comprising: ROM (Read-Only Memory), PROM (Programmable Read-Only Memory), EPROM (Erasable PROM), Flash memory, EEPROM (Electrically Erasable PROM), a hard disk unit etc., and be arranged in or in connection with the control unit, whereupon the computer program is executed by the control unit. The behaviour of the vehicle in a specific situation can thus be adapted by modifying the instructions of the computer program.

Figure 1B:
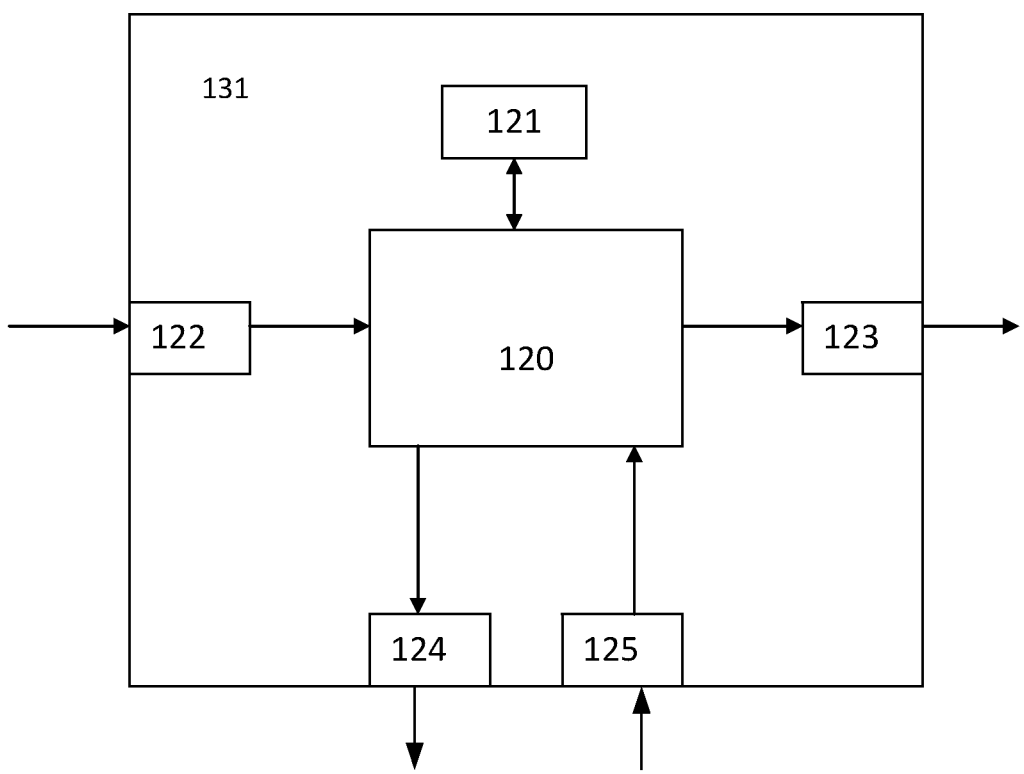
FIG. 1B illustrates an example of a control unit in a vehicle control system.

An exemplary control unit (the control unit 131) is shown schematically in FIG. 1B, wherein the control unit can comprise a processing unit 120, which can consist of, for example, any suitable type of processor or microcomputer, such as a circuit for digital signal processing (Digital Signal Processor, DSP) or a circuit with a predetermined specific function (Application Specific Integrated Circuit, ASIC). The processing unit 120 is connected to a memory unit 121, which provides the processing unit 120, with e.g. the stored program code 126 and/or the stored data that the processing unit 120 requires to be able to perform calculations. The processing unit 120 is also arranged so as to store partial or final results of calculations in the memory unit 121.

Furthermore, the control unit 131 is equipped with devices 122, 123, 124, 125 for receiving and transmitting input and output signals, respectively. These input and output signals can comprise waveforms, pulses or other attributes that the devices 122, 125 for receiving input signals can detect as information for processing by the processing unit 120. The devices 123, 124 for transmitting output signals are arranged so as to convert calculation results from the processing unit 120 into output signals for transfer to other parts of the vehicle control system and/or the component (s) for which the signals are intended. Each and every one of the connections to the devices for receiving and transmitting respective input and output signals can consist of one or more of a cable; a data bus, such as a CAN bus (Controller Area Network bus), a MOST bus (Media Oriented Systems Transport) or any other bus configuration, or of a wireless connection.

Returning to the exemplary method 300 illustrated in FIG. 3, the method starts in step 301, where it is determined whether the reduction of a substance occurring in the exhaust gas stream leaving the internal combustion engine 101 is to be diagnosed. The method remains in step 301 for as long as this is not the case. The method continues to step 302 when it is determined that reduction is to be diagnosed. The transition from step 301 to step 302 can, for example, be initiated according to various criteria. For example, the determination can e.g. be arranged to be performed at regular intervals. Also, the determination can be arranged to be performed e.g. each time the internal combustion engine 101 is started and/or each time there is an indication that a refill of additive has taken place. The method of FIG. 3 may also be arranged to be performed continuously.

In step 302, a timer t1 starting a first time period tlim1 is set to zero, and in step 303 an accumulation of a supply of reagent/additive to the exhaust gas stream is commenced. According to the present example, the additive consists of a solution comprising urea as reagent, and the accumulation can be measured in terms of injected additive and/or as an accumulation of reagent being injected into the exhaust gas stream. An accumulation of reagent can be determined e.g. using the amount of injected additive and a measurement of quality using the quality sensor 211, which e.g. may deliver a signal representing a percentage of urea in the additive so that the total amount of injected reagent can be determined, and which, depending on quality, may differ for a same amount of injected additive. It is also contemplated that an additive consisting purely of reagent may be used, such as, for example, ammonia. Hence, according to embodiments of the invention, determination of an accumulated supply of additive may be equivalent to a determination of an accumulated supply of reagent.

In step 304, a corresponding accumulation of a representation of the expected reduction of nitrogen oxides $NO_x$ is estimated on the basis of the supplied additive. This estimation can be performed as an integration, or sum of, the reduction for each moment in, or fraction of, time, such as for each injection of additive to be accumulated as the supply of additive accumulates, where a representation of the presence of nitrogen oxides $NO_x$ in the exhaust gas stream for each corresponding moment in, or fraction of, time can be used in the determination of the representation of the reduction.

According to the present example, a presence of $NO_x$ upstream the supply of additive is determined through the use of measurement by means of a $NO_x$ sensor 207 (see FIG. 2). Alternatively, the presence of $NO_x$ upstream the supply of additive can be determined e.g. by means of a model representation, e.g. taking internal combustion engine operation parameters into account as is known per se.

The representation of the reduction can be determined as the quantity/amount of $NO_x$ being reduced, i.e. converted to other compositions such as, in this example, e.g. nitrogen and water. Also, the reduction can be determined as expressed in quantity remaining in the exhaust gas stream. Furthermore, the reduction can be determined e.g. in a quantity per unit time, such as grams (g) per hour, or e.g. quantity per unit work produced by the internal combustion engine, such as grams (g) per kWh. The representation of the reduction can also be determined in any other suitable way, such as a remaining or reduced percentage of original occurrence etc.

Consequently, the reduction can be determined as an accumulation of instant, or substantially instant, reduction for each moment/fraction of the total period in time during which accumulation is ongoing. It is also contemplated that the reduction is determined by first determining a total accumulation of additive during the period of time during which accumulation is ongoing, which is then used to estimate a total expected reduction during the period of time for which supply of additive is accumulated. For example, e.g. 100% of the supplied amount of reagent can be assumed to reduce nitrogen oxides NOR, where general chemical relationships can be used in this determination. For example, it takes 2 g of AdBlue to reduce 1 g of nitrogen oxides $NO_x$. Alternatively, the efficiency of the conversion can be assumed to be e.g. some percentage, such as a percentage in the order of 80-100%, where the percentage e.g. may depend on current engine load, temperature of the catalytic converter etc.

In step 305 a corresponding accumulation of a representation of the actual reduction of $NO_x$ is initiated. In view of the above, the initiation of the accumulation of the actual reduction of nitrogen oxides $NO_x$ may consist of an accumulation of the presence of $NO_x$ upstream the supply of additive, and a corresponding accumulation of the presence of $NO_x$ downstream the supply of additive, where the reduction can be determined by comparing these accumulations.

The presence of nitrogen oxides $NO_x$ upstream the supply of additive may be determined as above, e.g. through the use of a $NO_x$ sensor 207 or by means of a model representation, where the same determination of $NO_x$ upstream the supply of additive can be used both for the estimation of the expected reduction and the determination of the actual reduction can be used.

The presence of $NO_x$ downstream the supply of additive, and also downstream the catalytic converter 201, can be determined through the use of a $NO_x$ sensor 208 (see FIG. 2) being subjected to the exhaust gas stream downstream the catalytic converter.

In step 306 it is determined whether the time period t1 has reached time tlim1, and for as long as this is not the case the accumulation continues. The time tlim1 may be predetermined and of suitable length, and e.g. be determined as a minimum accumulated quantity of additive having been injected into the exhaust gas stream. If the accumulated quantity of additive being injected into the exhaust gas stream is determined e.g. by means of a float 212, accumulation of relatively large quantities may be required, such as in the order of one or more litres of additive in order to be able to determine consumption, and hence injection, with sufficient accuracy. The first time tlim1 may also be arranged to be determined as a period of time during which the internal combustion engine produces some suitable amount of work, e.g. in terms of kWh.

If e.g. an ultrasound sensor is used to measure consumption of additive, smaller quantities may be used to define the time tlim1 due to higher measurement accuracy. If the supply of additive is determined by injections using the nozzle, the accumulated supply can be determined from injection time, injection pressure and nozzle particulars. In this case even smaller accumulated quantities may be utilized, hence allowing diagnose in a shorter period of time. According to embodiments of the invention, the diagnosis may first be carried out using a quantity of supply determined by nozzle particulars, and if this diagnose indicates improper operation, a further diagnose may be performed where supply of additive is determined using measurements of consumption in the additive tank and hence for a longer period of time. It is also possible to perform both variants simultaneously.

Also, according to embodiments of the invention it can be required that the internal combustion engine produces at least a predetermined minimum work so that measurements are not performed when engine load is too low. Hence, measurements can be paused when engine load is below some load limit.

Returning to step 306, when the time period tlim1 has expired, an estimation of the expected reduction of $NO_x$ during the time period tlim1 may have been determined as time progress. Otherwise the estimation can be performed when tlim1 has lapsed from the accumulated injected additive and, possibly, accumulated occurrence upstream the supply of additive. Similarly, a determination of actual reduction may have been performed during accumulation or can otherwise be performed using the accumulated occurrences of $NO_x$ upstream and downstream the supply of additive, respectively.

The method then continues to step 307, where the estimated, i.e., expected reduction of $NO_x$ and the actual reduction of $NO_x$ are compared. If the actual accumulated occurrence of $NO_x$ in the exhaust gas stream exceeds the accumulated expected occurrence the method continues to step 308, otherwise the method is ended, step 310, and the system deemed to operate properly.

In step 308 it is determined whether the actual occurrence of $NO_x$ in the exhaust gas stream following the reduction exceeds the accumulated expected remaining occurrence $NO_x$ to some suitable predetermined extent, i.e. the actual reduction is smaller than the expected (predicted) reduction to some extent. If this is the case, the method continues to step 309 where a signal indicating a fault in the reduction of $NO_x$ is generated. Otherwise, the method is ended in step 319. The signal generated in step 209 may e.g. consist of a setting of one or more diagnostic trouble codes. The method may then be ended in step 319. According to the present embodiment, further tests evaluating the reduction are performed, as described below in order to further isolate the probable cause of the indicated fault.

The criteria for generating a signal indicating a fault may e.g. be some suitable percentage, such as e.g. the actual reduction being less than estimated reduction by some percentage in the interval 10%-30%, where in this example the reduction is measured in terms of $NO_x$ being reduced, which may be expressed e.g. as a quantity or percentage. As was mentioned, the reduction may be expressed in various terms and ways, and if expressed e.g. as actual remaining $NO_x$ in comparison to estimated expected remaining $NO_x$, the signal may instead be generated when the actual remaining occurrence of $NO_x$ exceeds the estimated expected remaining occurrence by percentage in the interval 10%-30%, or any other suitable interval.

The estimation of expected reduction of $NO_x$ and the determination of actual reduction of $NO_x$ are preferably determined for the same time interval as in the present example, but this is not an absolute requirement, and if the time intervals differ, this can be compensated for, e.g. by a factor representing the difference between the time periods being used. For example, if the diagnosis is performed during essentially steady state conditions, compensation may be performed in a straight forward manner. Still the estimation of the expected reduction of $NO_x$ and the determination of actual reduction of $NO_x$ are determined for substantially the same time interval in absolute time, i.e. there is a substantial overlap in absolute time in regard of the periods for which the accumulations are performed.

If one or more diagnostic trouble codes are set, these may form reason for testing of the supply of additive when the vehicle is taken in for service. However, as in the present example, at least some tests may also be performed during normal operation.

For example, according to the present embodiment of the invention, the $NO_x$ sensors are evaluated in step 310, or, in case the occurrence of $NO_x$ upstream the supply of additive is determined by means of a model, the sensor downstream the supply of additive. The determination whether it can be assumed that the $NO_x$ sensors 207 and 208 are working properly, or whether any of the sensors is assumed to be malfunctioning may in addition, for example, be determined by analysing the magnitude of received sensor signals, and/or presence or lack of sensor signals. Also, it can be checked whether diagnostic trouble codes have been already activated in regard of sensor 208.

Other methods for evaluating sensor performance may also be used, and according to the present example, intrusive evaluation is performed, i.e. the evaluation has an impact on vehicle exhaust emissions and for this reason should not be performed too often. In this example, the supply of additive is stopped, and, possible following a period of time to allow reagent stored in the catalytic converter to be consumed, sensor signals from sensors 207, 208 are compared. When no additive is supplied, and the sensors are subjected to substantially the same occurrence of $NO_x$, similar signals should be delivered, taking into account sensor accuracy. If the sensor signals correspond to a sufficient extent, e.g. taking sensor accuracy into account, the sensors 207, 208 can be concluded to operate properly and $NO_x$-sensor functionality be disregarded as cause of error, while on the other hand diagnostic trouble codes can be set if one or both sensors is deemed faulty. In case the occurrence of $NO_x$ upstream the supply of additive is determined using a model the same evaluation can be performed, where the model replaces the signals from sensor 207. If it is determined in step 311 that discrepancies exist between the estimated occurrence and the measured occurrence, suitable diagnostic trouble codes can be set in step 312 for later attendance when the vehicle is taken in for service.

In addition to evaluating the $NO_x$ sensors, it can be evaluated whether the consumption of additive equals an expected consumption, step 313. For example, an accumulated consumption can be determined according to the above in regard of injection time and injection pressure of the injection nozzle. This accumulated consumption can then be compared with a consumption determined by the float or other measurement means arranged in the additive tank, and if there is a discrepancy and the consumptions do not correspond to a sufficient extent, step 314, one or more trouble codes with regard to the supply of additive can be set, step 315, for further attendance when the vehicle is taken in for service.

If said test or tests does not indicate a malfunction, a malfunctioning quality sensor may be the reason for improper operation of the reduction, and the quality sensor can, for example, be evaluated, step 316, when the vehicle is taken in for service by comparing, step 317, sensor signals from the quality sensor in the tank with sensor signals from an additional quality sensor which e.g. can be submerged into the additive tank for comparison. If the quality sensor is deemed faulty, appropriate trouble codes can be set, step 318, and/or the sensor be replaced e.g. if the vehicle already is taken in for service. The disclosed tests may be performed in any other order and/or, where possible, simultaneously in parallel.

It is also contemplated that the evaluations above may result in inducements. Legislation may include inducements to provide the driver with incentive to ensure that proper additive is used. For example, in case a malfunction with regard to the reduction of a substance is detected, the vehicle control system may be required to take inducement measures regarding e.g. vehicle performance, oftentimes in terms of limiting the work produced by combustion. Tests according to the above may in addition to the above have as result that inducements are introduced when malfunctions are detected and also avoided if reduction is deemed to operate properly.

Finally, the present invention has been exemplified for a vehicle. The invention is, however, applicable in any kind of craft, such as, e.g., aircrafts, watercrafts and spacecrafts. The invention is also applicable for use in combustion plants. Also, the aftertreatment system may comprise further components such as one or more particle filters, one or more oxidation catalytic converters as is known per se. It is also contemplated that the aftertreatment system may comprise more than one SCR catalytic converter.

The invention claimed is:

1. A method for diagnosing aftertreatment of exhaust gases resulting from combustion, wherein at least a first substance resulting from said combustion is reduced by supplying additive to an exhaust gas stream resulting from said combustion and use of a first reduction catalytic converter, the method comprising:
   estimating an accumulated expected reduction of said first substance during a first period of time on the basis of a measure of quality of said additive, said measure of quality being determined by means of a quality sensor being subjected to said additive;
   determining an accumulated actual reduction of said first substance during a period of time at least substantially overlapping said first period of time; and
   generating a signal indicating a fault in said reduction of said first substance when said accumulated actual reduction differs from said accumulated expected reduction by a predetermined difference in occurrence of said first substance.

2. A method according to claim 1, further comprising:
   determining a first accumulated supply of additive during said first period of time; and
   estimating said accumulated expected reduction of said first substance further on the basis of said first accumulated supply of additive.

3. A method according to claim 1, further comprising:
   determining said accumulated reductions as accumulated quantities of said first substance.

4. A method according to claim 3, further comprising:
   determining said accumulated reductions as quantities being reduced or quantities remaining in the exhaust gas stream following reduction.

5. A method according to claim 2, further comprising determining said first accumulated supply of additive by determining a decrease in a degree of filling in a tank containing said additive.

6. A method according to claim 2, further comprising determining said first accumulated supply of additive from injection pressure and opening time of an injection nozzle injecting said additive into said exhaust gas stream.

7. A method according to claim 1, further comprising:
   determining said accumulated actual reduction by determining the presence or occurrence of the substance to be reduced upstream the supply of additive; and
   comparing this occurrence with a measured occurrence downstream the supply of additive.

8. A method according to claim 7, further comprising determining said presence or occurrence of the substance to be reduced upstream the supply of additive by means of a model and/or use of a sensor located upstream the supply of additive.

9. A method according to claim 7, further comprising determining said presence or occurrence of the substance to be reduced while additive is supplied to said exhaust gas stream.

10. A method according to claim 7, further comprising determining said presence or occurrence of the substance to be reduced continuously during the period of time for which the actual reduction is accumulated.

11. A method according to claim 1, further comprising generating a signal indicating a fault when said comparison indicates that an actual occurrence of said first substance following said reduction exceeds said accumulated expected occurrence of said first substance following said reduction by a predetermined difference in occurrence.

12. A method according to claim 1, further including accumulating said reduction at least during a time period in the interval 2 minutes to four hours.

13. A method according to claim 1, further comprising:
   determining said first accumulated supply of additive from injection pressures and opening times of an injection nozzle injecting said additive into said exhaust gas stream;
   when said accumulated actual reduction deviates from said accumulated expected reduction by said predetermined difference in occurrence of said first substance, determining a second accumulated supply of additive by determining a reduction of a degree of filling in a tank containing said additive during a second period of time, said second period of time being longer than said first period of time; and
   generating said signal indicating a fault in the reduction when, following said second period of time, said accumulated actual reduction deviates from said accumulated expected reduction by said predetermined difference in occurrence of said first substance.

14. A method according to claim 1, further comprising determining said actual reduction of said first substance by means of a measure of said occurrence of said first substance downstream said reduction catalytic converter, said measure being determined by means of sensor means.

15. A method according to claim 1, further comprising, when said signal indicating a fault in the reduction is generated:
   performing a first test of sensor means measuring said occurrence of said first substance in said exhaust gas stream to evaluate operation of said sensor means; and
   generating a signal indicating sensor means fault when said evaluation of the operation of said sensor means indicates improper operation of said sensor means.

16. A method according to claim 1, further comprising, when said signal indicating a fault in the reduction is generated:
   performing a test of consumption of additive, including:
      determining a further accumulated supply of additive from injection time and injection pressure of an injection nozzle; and
      comparing said further accumulated supply of additive with a consumption of additive determined by measurement means arranged in a tank containing said additive; and
   generating a signal indicating a fault in consumption of additive when said further accumulated supply of additive and said consumption of additive determined by said measurement means differs by a predetermined amount of additive.

17. A computer program product stored on a non-transitory computer-readable medium, said computer program product for diagnosing aftertreatment of exhaust gases resulting from combustion, wherein at least a first substance resulting from said combustion is reduced by supplying additive to an exhaust gas stream resulting from said combustion and use of a first reduction catalytic converter, said computer program product comprising computer instructions to cause one or more electronic control units or computers to perform the following operations:

estimating an accumulated expected reduction of said first substance during a first period of time on the basis of a measure of quality of said additive, said measure of quality being determined by means of a quality sensor being subjected to said additive;

determining an accumulated actual reduction of said first substance during a period of time at least substantially overlapping said first period of time; and generating a signal indicating a fault in said reduction of said first substance when said accumulated actual reduction differs from said accumulated expected reduction by a predetermined difference in occurrence of said first substance.

18. A system for diagnosing aftertreatment of exhaust gases resulting from combustion, wherein at least a first substance resulting from said combustion is reduced by supplying additive to an exhaust gas stream resulting from said combustion and use of a first reduction catalytic converter, the system comprising:

means for estimating an accumulated expected reduction of said first substance during a first period of time on the basis of a measure of quality of said additive, said measure of quality being determined by means of a quality sensor being subjected to said additive;

means for determining an accumulated actual reduction of said first substance during a period of time at least substantially overlapping said first period of time; and means for generating a signal indicating a fault in said reduction of said first substance when said accumulated actual reduction differs from said accumulated expected reduction by a predetermined difference in occurrence of said first substance.

19. A vehicle comprising a system for diagnosing aftertreatment of exhaust gases resulting from combustion, wherein at least a first substance resulting from said combustion is reduced by supplying additive to an exhaust gas stream resulting from said combustion and use of a first reduction catalytic converter, the system comprising:

means for estimating an accumulated expected reduction of said first substance during a first period of time on the basis of a measure of quality of said additive, said measure of quality being determined by means of a quality sensor being subjected to said additive;

means for determining an accumulated actual reduction of said first substance during a period of time at least substantially overlapping said first period of time; and means for generating a signal indicating a fault in said reduction of said first substance when said accumulated actual reduction differs from said accumulated expected reduction by a predetermined difference in occurrence of said first substance.

\* \* \* \* \*